United States Patent [19]

Schultz

[11] Patent Number: 5,503,261
[45] Date of Patent: Apr. 2, 1996

[54] BI-DIRECTIONAL CENTRIFUGAL CLUTCH

[75] Inventor: Weston L. Schultz, Livonia, Mich.

[73] Assignee: Automotive Concepts Technology, Livonia, Mich.

[21] Appl. No.: 275,516

[22] Filed: Jul. 15, 1994

[51] Int. Cl.⁶ .............................. F16D 43/18; F16D 13/18
[52] U.S. Cl. .................. 192/105 CD; 192/75; 192/103 B
[58] Field of Search ...................... 192/105 CD, 103 B, 192/104 B, 75, 43

[56] References Cited

U.S. PATENT DOCUMENTS

| | | | |
|---|---|---|---|
| 2,087,968 | 7/1937 | Dodge | 192/105 CD |
| 2,869,344 | 1/1959 | Bochan | 192/105 CD |
| 2,970,680 | 2/1961 | Cain | 192/105 CD |
| 3,144,110 | 8/1964 | Van Doorne | 192/105 |
| 3,338,361 | 8/1967 | Hoff | 192/105 |
| 3,367,465 | 2/1968 | Newman | 192/105 |
| 3,581,857 | 6/1971 | Dallman | 192/41 |
| 3,797,331 | 3/1974 | Kjeldsteen | 74/752 |
| 3,810,533 | 5/1974 | Densow | 192/105 |
| 4,062,433 | 12/1977 | St. John | 192/104 |
| 4,160,389 | 7/1979 | Kubono | 74/89.18 |
| 4,226,320 | 10/1980 | St. John | 192/105 |
| 4,296,852 | 10/1981 | Luerken | 192/104 |
| 4,610,343 | 9/1986 | Hikari | 192/105 |
| 4,690,257 | 9/1987 | Suzuki et al. | 192/3.31 |
| 4,756,396 | 7/1988 | Nagashima et al. | 192/105 |
| 4,960,194 | 10/1990 | Sageshima et al. | 192/103 |
| 5,010,994 | 4/1991 | Heireth et al. | 192/103 |

Primary Examiner—Richard M. Lorence
Attorney, Agent, or Firm—Brooks & Kushman

[57] ABSTRACT

A bi-directional centrifugal clutch is provided having a clutch drum, a driving clutch member adapted to be rotatably driven in first and second directions. Drive pins mounted on the driving clutch member are operable for driving the driven clutch member in both directions. First and second clutch shoes each define slots for receiving the drive pins. A plurality of friction surfaces on the clutch shoes are adapted to engage the clutch drum selectively in accordance with rotation of the drive clutch member in the first and second directions. Each slot has opposite slot ends engaged in accordance with rotation of the drive plate in the first and second directions. Each clutch shoe is configured to effect pivotal movement about one of the drive pins in response to centrifugal forces. One friction surface on each clutch shoe engages the clutch drum when the drive plate is rotatably driven in the first direction and the other friction surface on each clutch shoe engages the clutch drum when the drive plate is rotatably driven in the second direction.

22 Claims, 3 Drawing Sheets

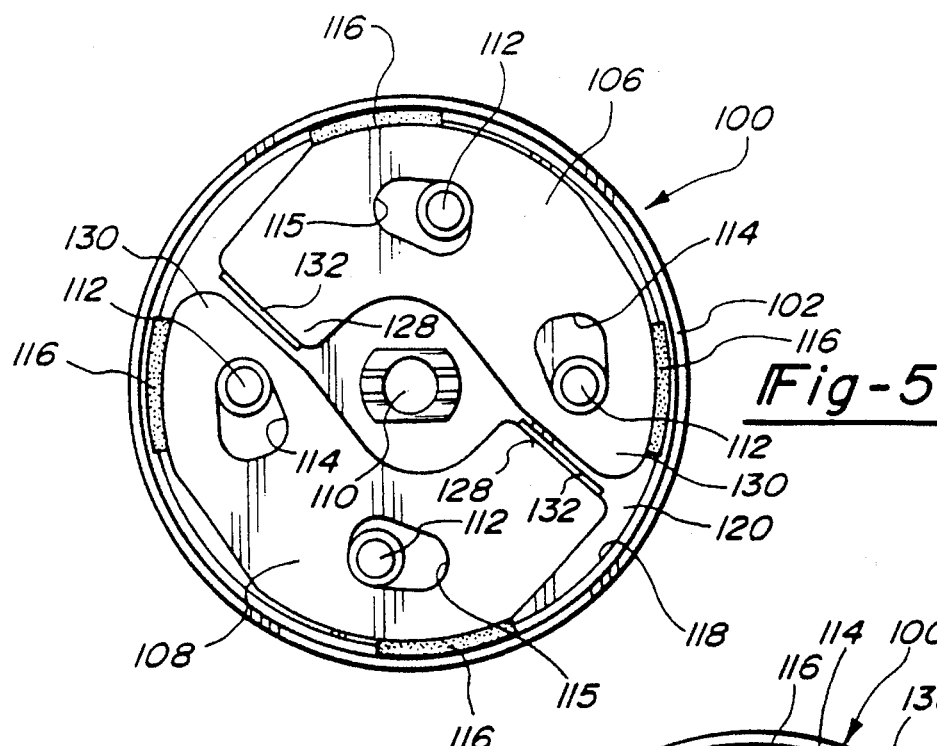
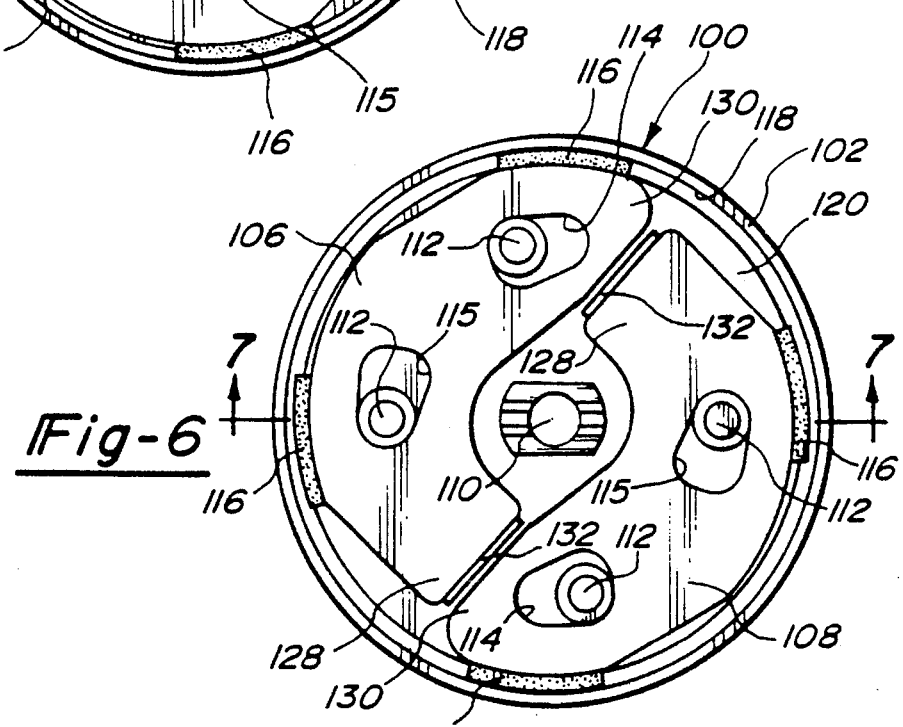
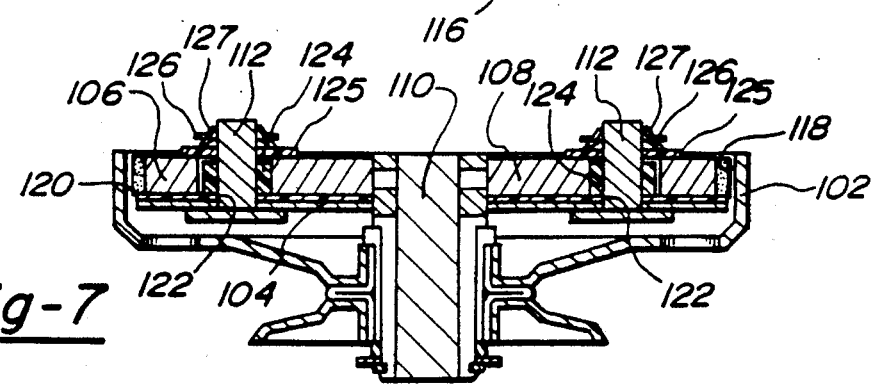

BI-DIRECTIONAL CENTRIFUGAL CLUTCH

TECHNICAL FIELD

This invention relates to bi-directional centrifugal clutches and, more particularly, to a selectively engaging bi-directional centrifugal clutch for transferring torque between the output of a motor and a rotating member.

BACKGROUND ART

Centrifugal clutches are known in the art in which one or more clutch shoes are retained in retracted positions by springs until sufficient centrifugal force acts on the shoes to overcome the force of the retaining springs, whereupon the clutch shoes are actuated and swing outwardly to engage a stationary clutch housing or drum. These clutch constructions normally have a pair of arcuate-shaped clutch shoes which are pivotally mounted on a clutch braking plate and arranged in an end-to-end relationship with respect to each other. The braking plate is affixed to a drive shaft which is operably connected to a motor. The clutch shoes have various spring arrangements for biasing the shoes toward a retracted position, wherein the spring retaining tensions must be overcome by the centrifugal force exerted on the shoes during rotation of the driven member.

U.S. Pat. No. 4,296,852 issued to Luerken discloses an automatic two-way centrifugal clutch having a pair of clutch shoes mounted for pivotal movement on a rotating drive member. Each clutch shoe has a first state in which friction pads are in contact with a clutch drum, a second state in which the clutch shoes are out of contact with the clutch drum, and a third state in which the friction pads are in driving contact with the clutch drum. At least two spring members are connected to the clutch shoes for radially urging the friction pads against the clutch drum when the speed of rotation of the drive member is below a first predetermined speed. When the rotational speed of the rotating drive member is greater than the first speed, centrifugal forces overcome the spring force and pivot the clutch shoes to a position wherein the friction pads are out of engagement with the clutch drum. If the rotation speed is greater than a second predetermined speed, the centrifugal force urges clutch driving surfaces into driving contact with the clutch drum.

Another centrifugal clutch construction is disclosed in U.S. Pat. No. 4,226,320 to St. John. The St. John patent discloses a centrifugal clutch having a driving flange mounted on a hub which is adapted to be mounted on a driveshaft. A pair of clutch shoes are pivotally mounted at diagonally opposite ends of the shoes on the drive flange by a pair of pins which are cantilevered axially outwardly from the drive flange. The clutch shoes are mounted in end-to-end relationship with respect to each other. Extension springs bias the swinging ends of the clutch shoes toward a retracted position. The clutch shoes are adapted to move outwardly under the influence of centrifugal force and overcome the radial biasing effect of the springs to engage and drive a concentrically mounted clutch housing. A plurality of weight plates are mounted on the webs of the clutch shoes to provide various operating characteristics without changing the basic clutch construction.

As disclosed above, both centrifugal clutch constructions utilize radially operative helical clutch springs. It is known in the art that helical clutch springs and various other small working parts associated with the clutch springs often fail prior to complete failure of other clutch members. As such, the clutch springs are known to require replacement or repair. In addition, to adjust the performance of prior art clutches in opposite directions different springs having different degrees of spring bias are required that further complicate construction and servicing of such clutches.

It is therefore contemplated to provide a bi-directional centrifugal clutch which eliminates utilization of helical clutch springs or associated small parts while affording an efficient, low maintenance, bi-directional centrifugal clutch.

SUMMARY OF THE INVENTION

The invention in one embodiment provides a bi-directional centrifugal clutch when a clutch drum and drive plate are coupled and decoupled by a pair of clutch shoes which are pivotable in response to rotational forces acting on the clutch shoes. The drive plate is adapted to be rotated in either a first or a second direction and has a plurality of drive pins upon which a pair of clutch shoes are mounted. The clutch shoes each define a pair of arcuately elongated openings for receiving one of the drive pins. Each of the clutch shoes has a pair of friction pads oriented to selectively engage the clutch drum. Each opening has a pair of opposite, arcuately spaced ends that are engaged by one of the drive pins in accordance with the rotation of the drive plate in the first and second directions. Each of the clutch shoes is pivotable about one of the drive pins in response to rotational forces acting on the clutch shoe wherein the leading drive pin in relation to the direction of rotation provides the pivot point for the clutch shoe. One friction pad on each clutch shoe engages the clutch drum when the drive plate is rotatably driven in the first direction and the other friction pad on each clutch shoe engages the clutch drum when the drive plate is rotatably driven in the second direction.

The arcuately elongated openings have increased radial clearance between the pin and the opening at the arcuately adjacent ends of the pair of openings on each shoe. This increased radial clearance permits axial shifting of the shoes about the pivot point on the trailing drive pin in relation to the direction of rotation.

According to another aspect of the invention, a bi-directional centrifugal clutch having a clutch drum and a driving clutch member adapted to be rotatably driven in either a first or second direction along with a pair of clutch shoes is provided. First and second drive pins disposed on the driving clutch member cooperate with the clutch shoes. Each clutch shoe has a slot for receiving one of the first or second drive pins. The clutch shoes each include a pair of friction pads oriented for abutting engagement with the clutch drum selectively in accordance with rotation of said driving clutch member in either the first or second directions. Each slot has a pair of opposite slot ends operable respectively in accordance with the rotation of the clutch drum in the first and second directions when the drive pin engages the slot ends. Each of the clutch shoes, in cooperation with the respective slot, is configured to pivot about its respective drive pin in response to a centrifugal force occasioned by the configuration of the clutch shoe and the rotation of the clutch drum in either of said first and second directions. One friction pad of each clutch shoe engages the clutch drum when the driving clutch member is rotatably driven in the first direction and the other friction pad on the same clutch shoe engages the driving clutch member when said clutch drum is rotatably driven in the second direction.

It is an object of the present invention to provide a bi-directional centrifugal clutch wherein the clutch performance can be adjusted separately in either a first rotating direction or a second rotating direction by adjusting the arc length of the clutch shoe, the arc length of the slot encompassed on each individual shoe, the friction pad location, and clutch shoe thickness.

It is another object of the present invention to provide a bi-directional centrifugal clutch having a driving clutch member which includes a circumferential engagement surface and the pair of friction pads are arcuately spaced apart from each other on each of the clutch surfaces with one of the pair of friction pads on each of the clutch shoes being located diametrically opposite the other.

It is yet another object of the present invention provide a bi-directional centrifugal clutch which minimizes the use of small operable working components and clutch springs while still providing efficient bi-directional operation.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 5 is a side view of another embodiment of the bi-directional centrifugal clutch of the present invention illustrating one of each pair of friction pads on each clutch shoe engaging the clutch drum as the drive plate is rotated in a clockwise direction;

FIG. 6 is a side view of the bi-directional centrifugal clutch of the present invention illustrating the opposite one of each pair of friction pad on each clutch shoe engaging the drive pulley as the drive plate is rotated in the counterclockwise direction; and FIG. 7 is a cross-sectional view of the bi-directional centrifugal clutch of the present invention taken along the line 7—7 of FIG. 6.

BEST MODE FOR CARRYING OUT THE INVENTION

Figure 1:
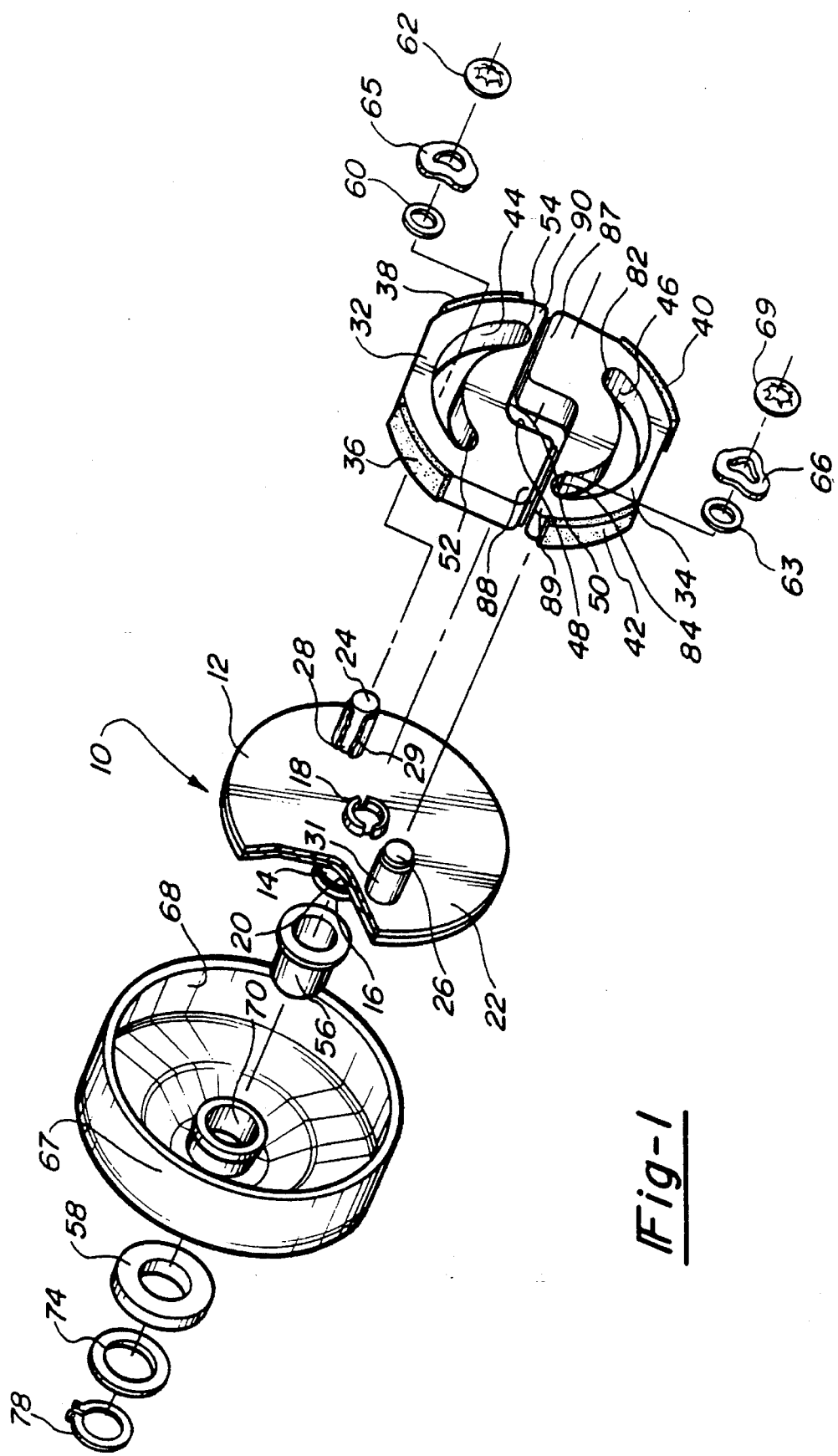
FIG. 1 is an exploded perspective view of the bi-directional centrifugal clutch of the present invention.

Referring now to FIG. 1 of the drawings, the bi-directional clutch of the present invention is shown and is generally indicated at 10. Clutch 10 includes a drive plate 12 having a main drive shaft 14. Main drive shaft 14 includes a first end 16 and a second end 18. First end 16 includes a snap ring groove 20. End 18 of main drive shaft extends through drive plate 12. Main drive shaft 14 is preferably manufactured from a hardened steel. The clutch can be a dry clutch or a wet clutch which may be immersed in hydraulic oil.

A drive plate shield 22 is shown in FIG. 1, shaped to correspond to drive plate 12. Drive plate shield 22 is preferably manufactured from a polymeric material, such as heat stabilized Nylon. Drive pins 24 and 26 are located on drive plate 12 and extend perpendicularly from drive plate 12.

Figure 4:
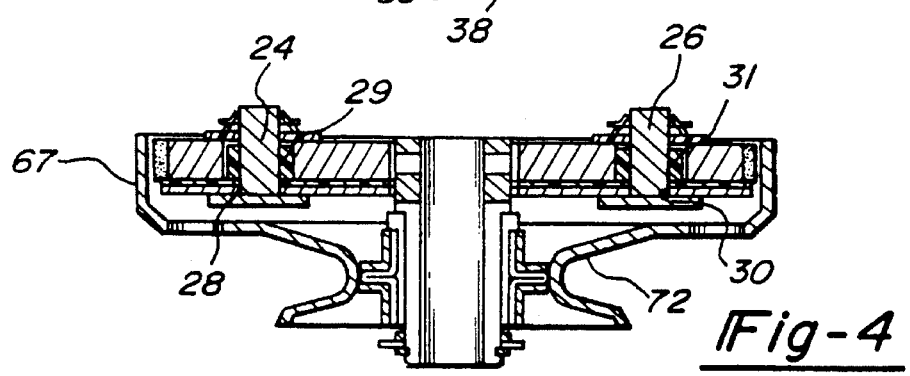
FIG. 4 is a cross-sectional view of the bi-directional clutch of the present invention taken along lines 4—4 of FIG. 3.

Drive plate shield 22 includes a pair of apertures 28 and 30, as shown in FIG. 4, through which drive pins 24 and 26 extend respectively. Drive pin 24 and 26 are encompassed by cushioning sleeves 29 and 31, respectively. Cushioning sleeves 29 and 31 are preferably manufactured from an polymeric material such as 30% glass-reinforced nylon.

Figure 2:
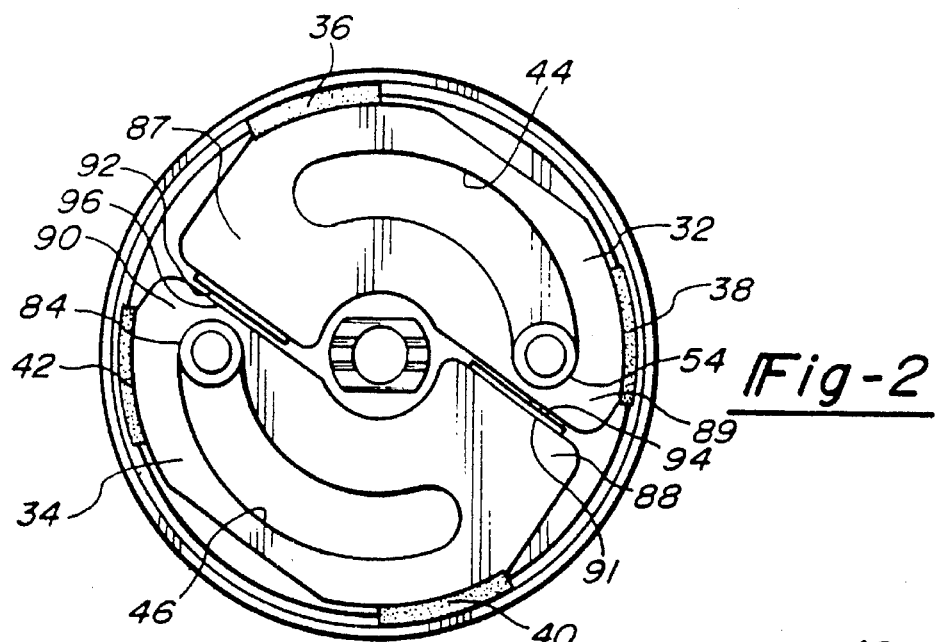
FIG. 2 is a side view of the bi-directional centrifugal clutch of the present invention illustrating one of each pair of friction pads on each clutch shoe engaging the drive pulley as the drive plate is rotated in a clockwise direction.
Figure 3:
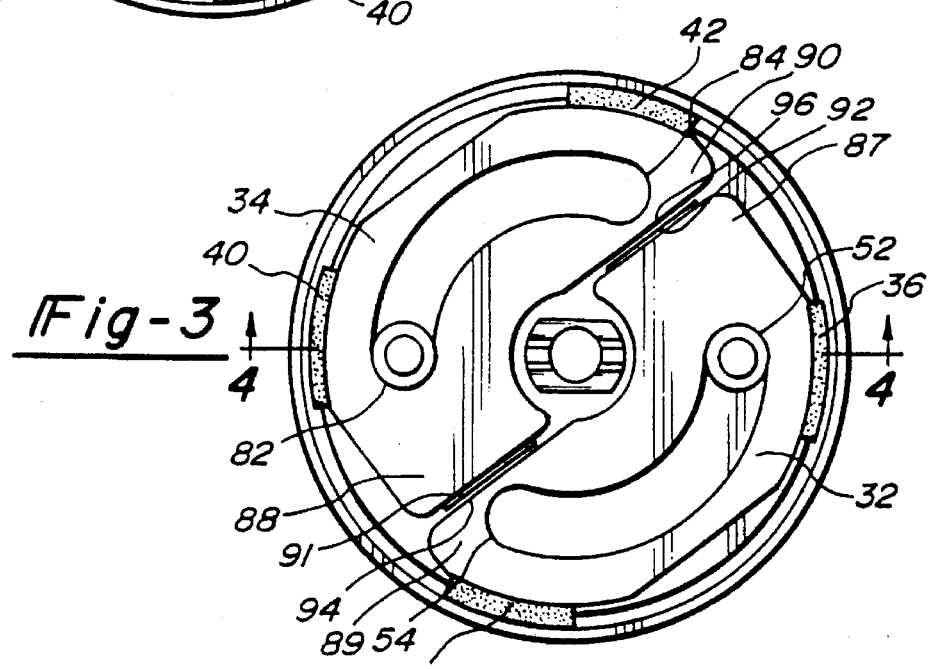
FIG. 3 is a side view of the bi-directional centrifugal clutch of the present invention illustrating the opposite one of each pair of friction pads on each clutch shoe engaging the drive pulley as the drive plate is rotated in the counterclockwise direction.

Referring now to FIGS. 1–3, the clutch shoes 32 and 34 are illustrated in more detail. Clutch shoes 32 and 34 are generally L-shaped and manufactured from a mild steel. Clutch shoe 32 includes a pair of friction pads 36 and 38. Clutch shoe 34 includes a pair of friction pads 40 and 42. Friction pads 36, 38, 40 and 42 are manufactured from a rubber-based friction material sold under the compound designation NF-964 which is commercially available from Motion Control Industries, Inc.

Clutch shoes 32 and 34 include arcuately-shaped slots 44 and 46, respectively. As clutch shoes 32 and 34 are substantially identical, for brevity reference will now be made primarily to clutch shoe 32 and slot 44 which should be understood as being equally applicable to clutch shoe 34 and slot 46. Slot 44 is generally arcuately shaped with the specific arcuate shape being generated by a semi-circle. The location of slot 44, as described above, is for explanatory purposes, and it should be understood that other slot locations and configurations are within the scope of the present invention.

Additionally, various alternative arcuate slot lengths can be utilized to form slot 44 with the above-described slot being the preferred embodiment. Slot lengths can vary from 20 degrees to 170 degrees about a central radius point. For example, slot 44 may have an approximate width of 0.52" affording an approximate clearance of 0.06 inches to allow drive pin 24 with sleeve 29 to move easily from one end 52 of slot 44 to the opposite end 54. More specifically, the overall diameter of the sleeve 28 should be approximately 0.06 inches less than the width of slot 44 to achieve the necessary clearance. As discussed above, clutch shoe 34 is designed in substantially the same manner.

Referring to FIG. 1, flange bearing 56 and a cooperating washer 58 function as bearing members for the driveshaft 14. A washer 60 is adapted to fit over drive pin 24 and push-on fastener 62 is adapted to secure washer 60 along with clutch shoe 32 against drive plate shield 22. Similarly, washer 63 is adapted to fit over drive pin 26 and push-on fastener 69 is adapted to secure washer 63 and clutch shoe 34 against drive plate 22. Additionally, crescent washers 65 and 66 may be secured to the drive pins 24 and 26 respectively between washer 60 and push-on fastener 62 to exert an axial biasing force to provide damping for dynamic shoe control. In this manner, clutch shoes 32 and 34 are structurally affixed in a movable pivotable fashion to drive plate shield 22. Push-on fasteners 62 and 69 are only affixed on the length of drive pins 24 and 26 to sufficiently retain the clutch shoes against the drive plate shield during operation of the clutch.

Referring to FIGS. 1 and 4, clutch drum 67 is shown having an inner circumferential engagement surface 68 and a receiving aperture 70. Flange bearing 56 and washer 58 are seated between the aperture 70 and driveshaft 14. Clutch drum 67 receives drive plate 12 including clutch shoes 32 and 34. Main drive shaft 14 is received within aperture 70 and extends out from aperture 70 through a pulley 72 forming a part of clutch drum 67. Washer 74 is adapted to fit over main drive shaft 14 and snap ring 78 cooperates with snap ring groove 20 to secure the clutch drum 67 onto drive plate assembly main drive shaft 14.

Referring now to FIG. 2, bi-directional clutch 10 is shown wherein the main drive shaft 14 is rotated in a clockwise direction by a motor or other conventional rotational driving means (not shown). It is within the scope of the present invention to have the main drive shaft driven by an electric motor, small internal combustion engine, air motor or any other rotational drive motor capable of producing power in the range of approximately ½ to 1 horsepower. Although, it is understood that present invention is operable and modifiable to any rotational driving means of any horsepower.

Drive pins 24 and 26 are disposed at slot ends 54 and 84 of the respective slots 44 and 46. As the main drive shaft continues to rotate and drives the drive pins 24 and 26, respectively, clutch shoes 32 and 34 pivot about drive pins 24 and 26. Clutch shoe 32 continues to pivot until abutting engagement is made between friction pad 36 and the inner circumferential surface 68 of clutch drum 67. Similarly, friction pad 40 pivots about drive pin 26 until friction pad 40 contacts the internal circumferential engagement surface 68 of clutch drum 67. In this manner, upon continued rotational drive of main drive shaft 14, the centrifugal force and pivotal motion of the clutch shoes will engage friction pads 36 and 40 until clutch drum 67 rotates along with main drive shaft 14 and drive plate 12.

Referring now to FIG. 3, clutch assembly 10 is shown with main drive shaft 14 being rotated in a counterclockwise direction by a motor as described above. In this manner, drive pins 24 and 26 move in relation to clutch shoes 32 and 34 until they have reached opposite slot ends 52 and 82, respectively. Upon reaching opposite slots ends 52 and 82, drive pins 24 and 26 move clutch shoes 32 and 34 in a counterclockwise direction. Upon reaching a certain rotational speed, the centrifugal force occasioned by the rotation of the clutch shoes forces clutch shoes 32 and 34 to pivot about drive pins 24 and 26 respectively. This pivotal movement forces opposite friction pads 38 and 42 to engage the inner circumferential surface 68 of clutch drum 67. In this manner, clutch drum 67 rotates counterclockwise along with drive shaft 14.

The torque capacity of the bi-directional clutch 10 of the present invention may be easily determined in both the clockwise and counterclockwise directions. The torque capacity is a direct function of the rotational speed and torque of main drive shaft 14, the location of the centroid of each frictional pad, the coefficient of friction of the pad in relation to the internal circumferential engagement surface of clutch drum 67 and the normal force applied to the frictional pad.

The present invention allows for changes in the torque capacity of the clutch shoes with respect to the direction of rotation about the main drive shaft. For example, the torque capacity could be increased in relation to the clockwise direction by adding mass to the clutch shoes in toe areas 87 and 88 to increase the normal force on friction pads 36 and 40 to again increase the torque capacity. Alternatively, the torque capacity could be changed in relation to the clockwise direction by changing the arc length of the slots 44 and 46 and moving slots ends 54 and 84 further away from slot ends 52 and 82 to again increase the normal force on frictional pads 36 and 40 upon rotation of main drive shaft in a clockwise direction.

Similarly, if an increase in torque capacity is required in the counterclockwise direction, the mass of the shoes in the heel areas 89 and 90 could be increased to increase the normal force applied on frictional pads 38 and 42. Lastly, slot ends 52 and 82 could be moved farther away from slot ends 54 and 84 to increase the normal force applied on frictional pads 38 and 42 to increase the torque capacity in a counter clockwise direction. To change the torque capacity in both directions, the thickness of the shoes 32, 34 and friction pads 36, 38, 40 and 42 can be modified.

The present invention further includes bumper pads 91 and 92 which are disposed on the toe areas 87 and 88 of respective clutch shoes 32 and 34. In this manner, as the bi-directional clutch is reversed from a clockwise direction to a counterclockwise direction or vice versa, the ensuing abutting engagement of bumper pad 91 and 92 with the opposite clutch shoe surfaces 94 and 96 reduces the operational overall noise of the present invention. Bumpers 91 and 92 are manufactured from heat stabilized Nylon. The bumpers are approximately 0.03 to 0.06 inches in thickness.

Referring now to FIG. 4, clutch drum 67 is shown including a pulley 72 which is operably connected to the transmission of a washing machine through the use of a drive belt (not shown). In this manner, when the bi-directional clutch assembly is run in the counterclockwise direction and the drive pulley is driven by the drive plate in cooperation with the friction pads and clutch shoes, the drive pulley is moved in a counterclockwise direction and runs the spin mode of the washing machine. In the spin mode, the transmission assembly rotates counterclockwise with the clutch drum 67. Alternatively, when operating in the clockwise direction, a transmission brake is applied to ground the transmission to the washing machine frame and the transmission drive shaft becomes operational thereby providing the agitate mode of the washing machine.

In the present invention, the bi-directional clutch does not include radially or centrifugally operating spring biasing mechanisms as required in prior art clutches to restrain the brake shoe engagement. This affords the present invention greater reliability and durability over long-term use of the clutch assembly and various driven mechanisms requiring a bi-directional clutch. Further, the number of working parts is minimized in the present invention and the bi-directional clutch shoes are essentially maintenance free.

Referring now to FIGS. 5–7, an alternative embodiment of the bi-directional centrifugal clutch 100 of the present invention is shown. The materials specified above for similar components of the embodiment of FIGS. 1–4 are also used in this embodiment. The clutch 100 includes a clutch drum 102 and a clutch plate 104 which engage one another by means of first and second clutch shoes 106 and 108, respectively. A drive shaft 110 is secured to the clutch plate 104. Rotational movement of the drive shaft 110 is transferred to the clutch plate 104. Drive pins 112 secured to the clutch plate 104 are loosely received in clockwise pivot openings 114 and counterclockwise pivot openings 115 formed in the clutch shoes 106 and 108. Openings 114 and 115 have an increased clearance at one end which facilitates radially shifting of the shoes 106 and 108 relative to the trailing pin depending on the direction of rotation. The clearance also allows for wear of the friction pads 116. Friction pads 116 are secured at arcuately spaced locations on the radially outwardly facing surfaces of the clutch shoes 106 and 108 for engagement with the inner circumferential engagement surface 118 of the clutch drum 102.

A drive plate shield 120 is preferably provided between the clutch plate 104 and the first and second clutch shoes 106 and 108. Drive plate shield 120 includes four drive pin apertures 122 which receive the drive pins 112. Drive pins 112 are preferably sheathed by sleeves 124. First and second clutch shoes 106 and 108 are retained on the drive pins 112 by washers 125, spring washers 126 and press-on fasteners 127. Spring washers 126 provide an axial load to the clutch shoes to provide damping to the movement of the clutch shoes as described above.

The first and second clutch shoes 106 and 108 each have a toe area 128 and a heel area 130. A cushioning member 132 is secured to the toe area 128 to reduce operational noise in the event of abutting engagement of the toe and heel areas 128 and 130 of opposite clutch shoes 106 and 108, respectively.

Operation of the alternative embodiment of the bi-directional centrifugal clutch 100 is described below. With a clockwise input as shown in FIG. 5, the pins 112 are moved within the shoes 106 and 108 as shown. The shoes 106 and 108 pivot about the lead pins 112 within clockwise pivot openings 114. Friction pads 116 located radially outboard of the counterclockwise pivot openings 115 are shifted into contact with the inner circumferential engagement surface 118 of the clutch drum 102. Frictional drag between the friction pads 116 and the clutch drum 102 cause the drum 102 to be carried along in the clockwise direction.

Conversely, with a counterclockwise input, as shown in FIG. 6, the drive pins 112 shift to the position shown in FIG. 6 relative to the first and second clutch shoes 106 and 108. The clutch shoes 106 and 108 pivot about the lead pins 112 within the counterclockwise pivot openings 115. Friction pads 116 located radially outboard of the clockwise pivot openings 114 are shifted into contact with the inner circumferential engagement surface 118 of the clutch drum 102. The resulting drag between the friction pads 116 and the drum 102 cause the drum to be carried along in the counterclockwise direction.

The capacity of the bi-directional centrifugal clutch 100 can be adjusted by changing location of the openings 114, by modifying the shape of the clutch shoes 106 and 108, modifying the thickness of the clutch shoes or by modifying the location or composition of the friction pads 116. It will be readily appreciated that the capacity of the clutch in either direction can be readily modified essentially independently of the clutch capacity in the opposite direction.

While the presently preferred embodiments of the present invention are shown and described, it is to be understood that the invention may be modified without departing from the principles of the present invention. Therefore, it is not intended that the invention be limited to details shown and described above, but rather should encompass any such changes and modifications within the broad scope of the following claims.

What is claimed is:

1. A bi-directional centrifugal clutch comprising:

a clutch drum;

a drive plate adapted to be rotated in first and second directions and having first, second, third and fourth drive pins;

a pair of clutch shoes, each shoe defining a pair of arcuately elongated openings, each of said openings receiving one of said drive pins, and each of said clutch shoes having a friction pad oriented to selectively engage said clutch drum, each of said openings having a pair of opposite arcuately spaced ends engaged by one of said drive pins in accordance with rotation of said drive plate in said first and second directions;

each of said clutch shoes being pivotable about one of said drive pins in response to rotational forces acting on said clutch shoe wherein one of said drive pins acts as a leading drive pin in the first direction of rotation and provides a pivot point for the clutch shoe and the other one of said drive pins acts as a leading drive pin in the second direction of rotation; and said friction pad on each clutch shoe engaging said clutch drum when said drive plate is rotatably driven in said first and on each clutch shoe engaging said clutch drum when said drive second directions.

2. A bi-directional clutch as in claim 1 wherein said arcuately elongated openings have increased radial clearance between the pin and the opening at the arcuately adjacent ends of the pair of openings on each shoe to permit radial shifting of the shoes about the point on the trailing drive pin in relation to the direction of rotation.

3. A bi-directional centrifugal clutch as in claim 1 wherein said clutch drum encompasses a portion of said driving clutch member and includes an inner, circumferential engagement surface disposed adjacent said friction pads.

4. A bi-directional clutch as in claim 3 wherein each of said friction pads further comprise a pair of friction pads arcuately spaced apart from each other on each of said clutch shoes, each of said pair of friction pads arcuately shaped to correspond with the contour of said inner circumferential engagement surface, one of said pair of friction pads on each of said clutch shoes located diametrically opposite each other.

5. A bi-directional centrifugal clutch as in claim 1 wherein said drive member further comprises a main drive shaft, said drive plate being connected to and extending radially outwardly from said main drive shaft whereby said drive pins are affixed to said drive plate and extend perpendicularly from the plate.

6. A bi-directional centrifugal clutch as in claim 5 further comprising a drive plate shield, said drive plate shield disposed between said drive plate and said clutch shoes including a pair of drive pin apertures adapted to receive said first and second drive pins in each clutch shoe.

7. A bi-directional clutch as in claim 1 further comprising first and second sleeve members, each of said sleeves adapted to encompass a respective one of said drive pins and wherein each of said drive pins and sleeves are received within one of said arcuately elongated openings.

8. A bi-directional clutch as in claim 7 wherein said sleeve members are rotatable on said drive pins.

9. A bi-directional clutch as in claim 1 wherein a plurality of spring washers are retained on said pins wherein an axial load may be applied to said clutch shoes to restrain movement thereof to a limited extent.

10. A bi-directional clutch as in claim 1 wherein each of said pair of clutch shoes includes a toe area and a heel area, each toe area including a cushioning member for reducing noise generated upon contact with the heel area of said other clutch shoe upon reversing said of bi-directional clutch from between said first direction and said second direction.

11. A bi-directional centrifugal clutch comprising:

a clutch drum;

a driving clutch member adapted to be rotated in first and second directions and having first and second drive pins;

a pair of clutch shoes, each shoe defining a slot for receiving one of said drive pins and each having a pair of friction surfaces oriented to selectively engage said clutch drum, each of said slots having a pair of opposite slot ends engaged by one of said drive pins in accordance with rotation of said driving clutch member in said first and second directions;

each of said clutch shoes being pivotable about its respective drive pin in response to rotational forces acting on said clutch shoe;

one of said pair of friction surfaces on each clutch shoe engaging said clutch drum when said driving clutch member is rotatably driven in said first direction and the other of said pair of friction surfaces on each clutch shoe engaging said clutch drum when said driving clutch member is rotatably driven in said second direction.

12. A bi-directional clutch as in claim 11 wherein said pair of friction surfaces is a pair of friction pads affixed to said clutch shoe.

13. A bi-directional centrifugal clutch as in claim 12 wherein said clutch drum encompasses a portion of said driving clutch member and includes an inner, circumferential engagement surface disposed adjacent said friction surfaces.

14. A bi-directional clutch as in claim 13 wherein said pair of friction surfaces are arcuately spaced apart from each other on each of said clutch shoes, each of said pair of friction surfaces arcuately shaped to correspond with the contour of said inner circumferential engagement surface, one of said pair of friction surfaces on each of said clutch shoes located diametrically opposite each other.

15. A bi-directional centrifugal clutch as in claim 11 wherein said drive member further comprises a main drive shaft and a drive plate connected to and extending radially outwardly from said main drive shaft whereby said drive pins are affixed to said drive plate and extend perpendicularly from the plate.

16. A bi-directional centrifugal clutch as in claim 15 further comprising a drive plate shield including a pair of drive pin apertures adapted to receive said first and second drive pins, said drive plate shield disposed between said drive plate and said clutch shoes.

17. A bi-directional clutch as in claim 11 further comprising first and second sleeve members, each of said sleeve members adapted to encompass a respective one of said first and second drive pins and wherein each of said drive pins and sleeve members are received within one of said slots.

18. A bi-directional clutch as in claim 17 wherein said sleeve members are rotatable on said drive pins.

19. A bi-directional clutch as in claim 11 wherein the shape of said slot is generated by an arc derived about a central radius point, said arc extending in a range from 20 degrees to 170 degrees about said central radius point.

20. A bi-directional clutch as in claim 11 wherein each of said pair of clutch shoes includes a toe area and a heel area, each toe area including a cushioning member for reducing noise generated upon contact with the heel area of said other clutch shoe upon reversing said of bi-directional clutch from between said first direction and said second direction.

21. A bi-directional centrifugal clutch comprising:

a combination clutch drum and pulley operably connected to said drive shaft;

a clutch drive plate adapted to be rotatably driven in first and second opposite rotational directions and having first and second drive pins thereon operable in both directions for driving said pulley member;

a pair of clutch shoes, each shoe defining an arcuate slot for receiving a respective one of said drive pins and a pair of friction surfaces operable to engage said combination clutch drum and pulley selectively in accordance with rotation of said drive clutch plates in said first and second directions, each of said arcuate slots having a pair of opposite slot ends operable respectively in accordance with said first and second directions to be driven by a respective drive pin when received therein;

each of said clutch shoes in cooperation with said respective arcuate slot being configured to effect pivotal movement of said respective clutch shoe about its respective drive pin in response to centrifugal force occasioned by the configuration of said clutch shoe and the rotation of said drive clutch plate in either of said first and second directions;

whereby one friction surface on each clutch shoe is operated into engagement with said pulley when said drive clutch plate is rotatably driven in said first direction and the other friction surface on each clutch shoe is operated into engagement with said drive clutch plate when said drive clutch plate is rotatably driven in said second direction, said combination clutch drum and pulley being selectively driven when said drive clutch plate is driven in said first direction and said pulley driving said transmission drive shaft when said drive clutch plate is driven in said second direction.

22. A bi-directional centrifugal clutch comprising:

a clutch drum;

a driving clutch member adapted to be rotatably driven in first and second directions and having a plurality of drive pins thereon operable for driving said driven clutch member in both directions;

a plurality of clutch shoes, each shoe defining a slot for receiving a respective one of said drive pins and a plurality of friction surfaces operable to engage said clutch drum selectively in accordance with rotation of said driving clutch member in said first and second directions, each of said slots having opposite slot ends engaged by a respective drive pin received therein in accordance with rotation of said drive clutch member in said first and second directions;

each of said clutch shoes in cooperation with said respective slot being configured to effect pivotal movement of said respective clutch shoe about a drive pin in response to centrifugal force occasioned by the configuration of said clutch shoe and the rotation of said drive clutch member in either of said first and second directions;

whereby one friction surface on each clutch shoe is operated into engagement with said driven clutch member when said drive clutch member is rotatably driven in said first direction and the other friction surface on each clutch shoe is operated into engagement with said drive clutch member when said drive clutch member is rotatably driven in said second direction.

* * * * *

UNITED STATES PATENT AND TRADEMARK OFFICE
CERTIFICATE OF CORRECTION

PATENT NO. : 5,503,261
DATED : April 2, 1996
INVENTOR(S) : Weston L. Schultz

It is certified that error appears in the above-indentified patent and that said Letters Patent is hereby corrected as shown below:

Column 4, line 51,    Delete "69" insert --68--.

Column 8, lines 10-11,    Delete "on each clutch shoe engaging said clutch drum when said drive".

Column 8, line 16,    Insert "pivot" before "point".

Signed and Sealed this

Tenth Day of September, 1996

Attest:

BRUCE LEHMAN

Attesting Officer    Commissioner of Patents and Trademarks